United States Patent [19]
White et al.

[11] Patent Number: 5,344,690
[45] Date of Patent: * Sep. 6, 1994

[54] CERAMIC ARTICLES HAVING CHANNELS FOR REGULATING THE PASSAGE OF FLUIDS

[75] Inventors: Danny R. White, Elkton, Md.; Michael K. Aghajanian, Newark, Del.

[73] Assignee: Lanxide Technology Company, LP, Newark, Del.

[*] Notice: The portion of the term of this patent subsequent to Mar. 22, 2011 has been disclaimed.

[21] Appl. No.: 34,323

[22] Filed: Mar. 22, 1993

Related U.S. Application Data

[60] Continuation of Ser. No. 839,456, Feb. 20, 1992, Pat. No. 5,196,271, which is a continuation of Ser. No. 697,749, May 6, 1991, abandoned, which is a continuation of Ser. No. 308,880, Feb. 9, 1989, abandoned, which is a division of Ser. No. 907,924, Sep. 16, 1986, Pat. No. 4,847,025.

[51] Int. Cl.$^5$ .................... C04B 35/65; F02M 61/16; B32B 3/24
[52] U.S. Cl. .................... 428/131; 428/137; 428/699; 428/304.4; 428/307.7; 428/312.2; 428/312.6; 428/314.2; 428/545; 501/97; 501/98; 501/127; 501/128; 501/96; 501/88; 425/67; 425/72.2; 239/533.2; 239/86; 239/310; 60/740
[58] Field of Search ............ 428/137, 131, 699, 304.4, 428/307.7, 312.2, 312.6, 314.2, 545; 501/97, 98, 127, 128, 96, 88; 425/67, 72.2; 222/566; 239/533.2, 86, 310; 60/740

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,538,231 | 11/1970 | Newkirk et al. | 13/25 |
| 3,751,271 | 8/1973 | Kimura et al. | 106/40 |
| 3,789,096 | 1/1974 | Church | 264/60 |
| 3,864,154 | 2/1975 | Gazza et al. | 29/123 B |
| 3,868,267 | 2/1975 | Gazza et al. | 117/22 |
| 3,914,527 | 10/1975 | Osterholtz et al. | 13/30 |
| 3,915,699 | 10/1975 | Umehara et al. | 75/208 R |
| 3,973,977 | 8/1976 | Wilson | 106/62 |
| 4,033,400 | 7/1977 | Gurwell et al. | 164/98 |
| 4,582,751 | 4/1986 | Vasilos et al. | 428/307.3 |
| 4,713,860 | 12/1987 | Newkirk et al. | 501/87 |
| 4,828,785 | 5/1989 | Newkirk et al. | 264/59 |
| 4,833,110 | 5/1989 | Newkirk | 501/128 |
| 4,847,025 | 7/1989 | White et al. | 501/87 |
| 4,847,220 | 7/1989 | Lesher et al. | 501/89 |
| 4,851,375 | 7/1989 | Newkirk et al. | 501/88 |
| 4,859,640 | 8/1989 | Newkirk et al. | 501/128 |
| 5,017,526 | 5/1991 | Newkirk et al. | 501/89 |
| 5,063,185 | 11/1991 | Dwivedi et al. | 501/127 X |
| 5,196,271 | 3/1993 | White et al. | 428/545 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |
| 1493102 | 11/1977 | United Kingdom |

OTHER PUBLICATIONS

"Oxidation of Molten Aluminum Alloys. Reaction with Refractories"–M. Drouzy and M. Richard–Mar., 1974–Fonderie, France No. 332, pp. 121–128.

"Refractories for Aluminum Alloy Melting Furnaces'–'–B. Clavaud and V. Jost–Sep., 1980–Lillian Brassinga (from French) Jan., 1985.

*Primary Examiner*—William Watkins, III
*Attorney, Agent, or Firm*—Mark G. Mortenson; Carol A. Lewis

[57] ABSTRACT

Self-supporting ceramic bodies comprising a polycrystalline material comprising the oxidation reaction product of a parent metal and having therein one or more channels which inversely replicate the geometry of the configured fugitive metal are formed. These self-supporting bodies may be utilized as articles for regulating and facilitating the passage of a fluid therethrough.

22 Claims, 3 Drawing Sheets

U.S. Patent  Sep. 6, 1994  Sheet 1 of 3  5,344,690
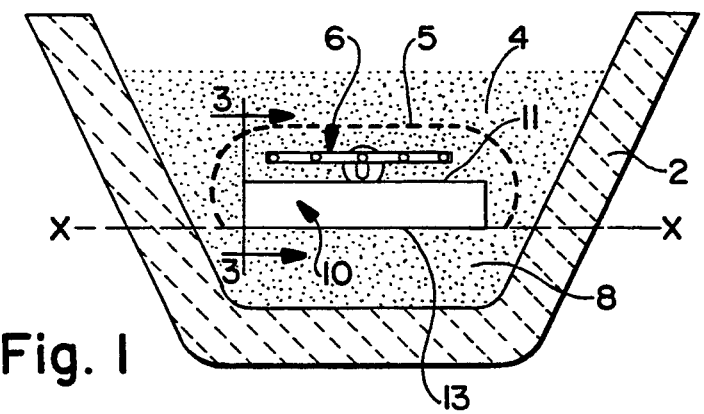
Fig. 1
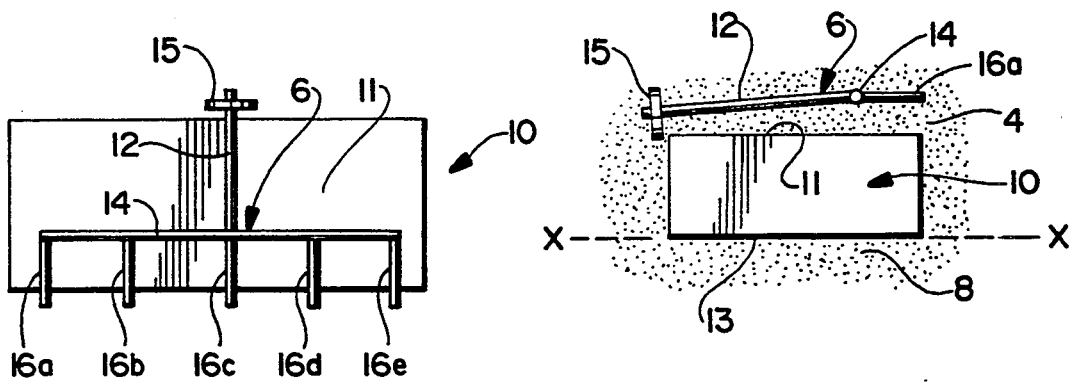
Fig. 2
Fig. 3
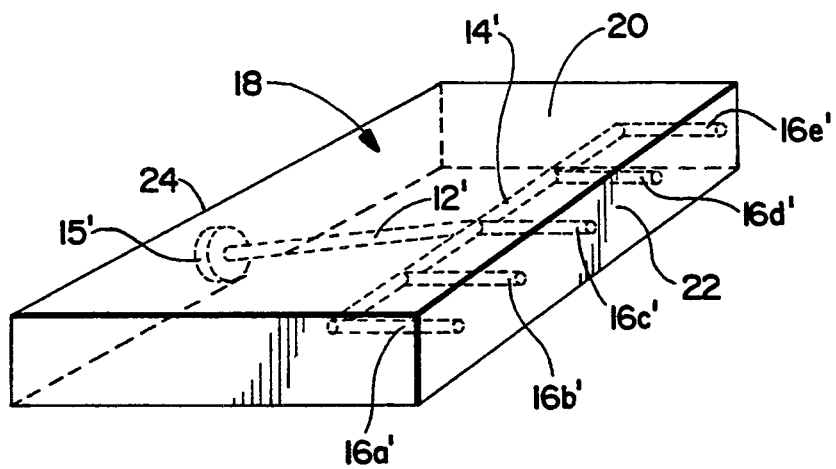
Fig. 4

CERAMIC ARTICLES HAVING CHANNELS FOR REGULATING THE PASSAGE OF FLUIDS

This is a continuation of copending application(s) Ser. No. 07/839,456 filed on Feb. 20, 1992, which issued on Mar. 23, 1993, as U.S. Pat. No. 5,196,271, which was a continuation of U.S. patent application Ser. No. 07/697,749, filed on May 6, 1991, now abandoned, which was a continuation of U.S. patent application Ser. No. 07/308,880, filed on Feb. 9, 1989, now abandoned, which was a divisional of U.S. patent application Ser. No. 06/907,924, filed on Sept. 16, 1986, and which issued on Jul. 11, 1989, as U.S. Pat. No. 4,847,025.

BACKGROUND OF THE INVENTION

1. Field of the Invention

The present invention broadly relates to self-supporting ceramic bodies and methods of making same, including composite ceramic bodies, having therein one or more channels which inversely replicate the geometry of a configured fugitive metal.

2. Background and Commonly Owned Patent Applications

The subject matter of this application is related to that of Commonly Owned U.S. Pat. No. 4,713,360, which issued on Dec. 15, 1987, and copending U.S. patent applications Ser. No. 818,943, filed Jan. 15, 1986 as a continuation-in-part of Ser. No. 776,964, filed Sept. 17, 1985 as a continuation-in-part of Ser. No. 705,787, filed Feb. 26, 1985, a continuation-in-part of Ser. No. 591,392, filed Mar. 16, 1984, all in the names of Marc S. Newkirk et al and entitled "Novel Ceramic Materials and Methods of Making The Same." This patent generically discloses the discovery of a method of making self-supporting ceramic bodies by use of a particular oxidation phenomenon to oxidize a parent metal precursor. The oxidation reaction may be enhanced by the use of a dopant alloyed into the parent metal, and affords self-supporting ceramic bodies of desired size grown as the oxidation reaction product of the parent metal.

The foregoing oxidation method was improved upon by the use of external dopants applied to the surface of the parent metal precursor as disclosed in Commonly Owned and copending U.S. applications Ser. No. 220,935, filed Jun. 23, 1988, which issued on Aug. 1, 1989, as U.S. Pat. No. 4,853,352, which is a continuation of Ser. No. 822,999, filed Jan. 27, 1986, as a continuation-in-part of Ser. No. 776,965, filed Sept. 17, 1985, as a continuation-in-part of Ser. No. 747,788, filed Jun. 25, 1985, as a continuation-in-part of Ser. No. 632,636, filed Jul. 20, 1984, all in the names of Marc S. Newkirk et al and entitled "Methods of Making Self-Supporting Ceramic Materials".

Use of the foregoing oxidation methods to make self-supporting ceramic bodies embedding one or more fillers is disclosed in Commonly Owned and copending U.S. patent application Ser. No. 819,397, filed Jan. 17, 1986 which issued on Jul. 25, 1989, as U.S. Pat. No. 4,851,375, and entitled "Composite Ceramic Articles And Methods Of Making The Same", which is a continuation-in-part of Ser. No. 647,876 filed Feb. 4, 1985, and entitled "Composite Ceramic Articles And Methods Of Making Same", both applications being filed in the names of Marc S. Newkirk et al. These copending applications disclose a novel method for producing a self-supporting ceramic composite body by growing an oxidation reaction product from a parent metal into a permeable mass of filler. The resulting composite, however, has no defined or predetermined configuration.

The ability to provide a defined or predetermined configuration to the ceramic body, i.e., the ability to grow a ceramic body to a predetermined size and shape was attained by infiltrating with the oxidation reaction product a shaped preform filler, i.e., infiltrating the shaped preform filler to its surface boundary. This technique is disclosed in Commonly Owned and copending U.S. patent application Ser. No. 861,025, filed May 8, 1986 in the names of Marc S. Newkirk et al and entitled "Shaped Ceramic Composites and Methods of Making the Same".

A further development of the foregoing methods enables the formation of self-supporting ceramic structures which contain therein one or more cavities which inversely replicate the geometry of a positive mold of shaped precursor parent metal embedded within a bed of conformable filler which is at least partially self-bonding under specified conditions as described in Commonly Owned and copending U.S. patent application Ser. No. 823,542 filed Jan. 27, 1986 which issued on May 9, 1989, as U.S. Pat. No. 4,851,375, in the names of Marc S. Newkirk et al, entitled "Inverse Shape Replication Method of Making Ceramic Composite Articles and Articles Obtained Thereby". Still another development of the foregoing methods enables the formation of self-supporting ceramic bodies having a negative pattern which inversely replicates the positive pattern of a parent metal precursor emplaced against a mass of filler, as described in Commonly Owned and copending U.S. patent application Ser. No. 896,157, filed Aug. 13, 1986 which issued on Aug. 22, 1989, as U.S. Pat. No. 4,859,640 in the names of Marc S. Newkirk and entitled "Method of Making Ceramic Composite Articles With Shape Replicated Surfaces and Articles Obtained Thereby". In both of these copending applications, the cavity inversely replicates the geometry of the parent metal.

The entire disclosures of all of the foregoing Commonly Owned and copending patent applications are expressly incorporated herein by reference. For certain applications, there is an interest in substituting ceramics for metals because, with respect to certain properties, ceramics are superior to metals. There are, however, several known limitations or difficulties in making this substitution such as scaling versatility, capability to produce complex shapes, satisfying the properties required for the end use application, and costs. The inventions set forth in the above-described Commonly Owned patent applications overcome many of these limitations or difficulties and provide novel methods for reliably producing ceramic materials, including composites.

The invention described in Commonly Owned patent application Ser. No. 823,542 (identified above) ameliorates the difficulties in formation of ceramic bodies having shapes with complicated internal cavities and especially shapes with re-entrant cavities. Conventional or known methods for making ceramic products with such shapes by compacting and sintering powder particles are not applicable, because the internal pattern required to establish the desired part geometry cannot be easily removed after the body is formed around it. While such part geometries can sometimes be prepared by machining the desired shape from a finished ceramic blank, this approach is rarely used because of the prohibitive costs.

SUMMARY OF THE INVENTION

The present invention provides a further method of producing ceramic bodies with one or more internal channels. Accordingly, this invention provides a method for producing a self-supporting ceramic body having therein one or more channels, passageways, cavities or the like which inversely replicate the geometry or pattern of a configured fugitive metal. The ceramic body is obtained by oxidation of a parent metal with an oxidant to form a polycrystalline material consisting essentially of the oxidation reaction product and one or more metallic constituents including constituents from the fugitive metal which, upon formation of the ceramic body, becomes dispersed within said body. In accordance with the method of this invention, an assembly of a patterned or configured fugitive metal and parent metal are positioned relative to each other so that growth or development of the oxidation reaction product from the parent metal will engulf at least a part of the configured fugitive metal. The parent metal is heated to a temperature above its melting point but below the melting point of the oxidation reaction product to form a body of molten parent metal and, at that temperature, the molten parent metal is reacted with the oxidant to form the oxidation reaction product. At this temperature, at least a portion of the oxidation reaction product is maintained in contact with and between the body of molten parent metal and the oxidant, to progressively draw molten parent metal through the oxidation reaction product and eventually about the configured fugitive metal to engulf the latter as oxidation reaction product continues to form at the interface between the oxidant and previously formed oxidation reaction product. The reaction is continued for a time sufficient to engulf at least a part of the configured fugitive metal within the polycrystalline material, and the engulfed fugitive metal becomes dispersed into the polycrystalline material to form one or more channels which substantially inversely replicates the geometry of the configured fugitive metal.

In another embodiment of the invention, the above method is modified to produce a self-supporting ceramic composite body having therein one or more channels by positioning the parent metal adjacent a permeable mass of filler material and orienting the parent metal and filler relative to each other so that formation of the oxidation reaction product will occur in a direction towards and into the mass of filler. In such a case, the configured fugitive metal is supported by the filler bed, and growth of the oxidation reaction product concurrently infiltrates the filler and engulfs the configured fugitive metal which becomes dispersed in the composite ceramic body. Where desired, the configured fugitive metal may be provided with a coating to protect the fugitive metal from premature dissolution or premature slumping due to melting thereby losing the predetermined pattern or configuration. Still further, a coating may be selected which, upon dispersion of the fugitive metal, forms a lining on the channel walls thereby enhancing the properties of the ceramic body.

In yet another aspect of the present invention, there is provided a self-supporting ceramic body or ceramic composite body having therein one or more channels which inversely replicate the geometry of a configured fugitive metal, and obtained by an oxidation phenomenon of a parent metal as described above.

Another specific aspect of the present invention includes utilizing as the fugitive metal a metal selected from one or more of iron, nickel, chromium and alloys and intermetallics of one or more thereof.

Generally, the present invention combines the processes of the Commonly Owned patents and patent applications with additional novel concepts to provide for the formation of ceramic bodies having one or more channels therein, including complex passageways having interconnections, changes of direction, sharp turns and complex configurations, by a technique which enables faithfully inversely replicating the approximate dimensions and configuration of a fugitive metal pattern, i.e., a preformed structure of desired configuration made of a metal which is dispersible into the polycrystalline material comprised of the oxidation reaction product of the parent metal. Upon dispersion into the polycrystalline material, the fugitive metal leaves behind one or more channels inversely replicating its former shape. The desired geometries of interior openings and passageways in a ceramic body can be attained by the techniques of the present invention much more easily than by conventional approaches or by drilling, grinding, or the like, the desired shape from a fabricated ceramic blank.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these (e.g., a solid and a gas) at the process conditions.

"Parent metal" means that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

"Fugitive metal" means a metal, intermetallic, or alloy which, upon being engulfed by the growing polycrystalline oxidation reaction product, is dispersed into the polycrystalline material to leave behind a channel substantially conforming in size and shape to the space formerly occupied by the fugitive metal. It further is understood that the fugitive metal may be of any desired or useful configuration, shape or form such as hollow bodies, particulates, powders, fibers, wires, spheres, bubbles, metal wool, plates, aggregate, rods, bars, platelets, pellets, tubes, wire cloth, sponge, tubules and sheets.

"Channel" or "channels" is used broadly meaning an unfilled space, cavity, passageway, or the like, not necessarily of uniform dimension, within a mass or body of suitable or desired configuration, and is not limited to a tube-like configuration.

BRIEF DESCRIPTION OF THE DRAWINGS

FIG. 1 is a schematic, cross-sectional view in elevation showing an assembly of a parent metal precursor and a configured fugitive metal disposed adjacent each other within a bed of particulate filler, the assembly being contained within a refractory vessel;

FIG. 2 is a plan view on a slightly enlarged scale of the assembly of the shaped parent metal precursor and configured fugitive metal utilized in the assembly of FIG. 1 with the filler omitted for improved clarity of illustration;

FIG. 3 is a view taken along line 3—3 of FIG. 1;

FIG. 4 is a perspective view on a further enlarged scale of a self-supporting ceramic composite made from the assembly of FIG. 1 and showing in phantom outline the internal openings, comprising a network of passageways, formed therein;

DETAILED DESCRIPTION OF THE PREFERRED EMBODIMENTS

Figure 5:
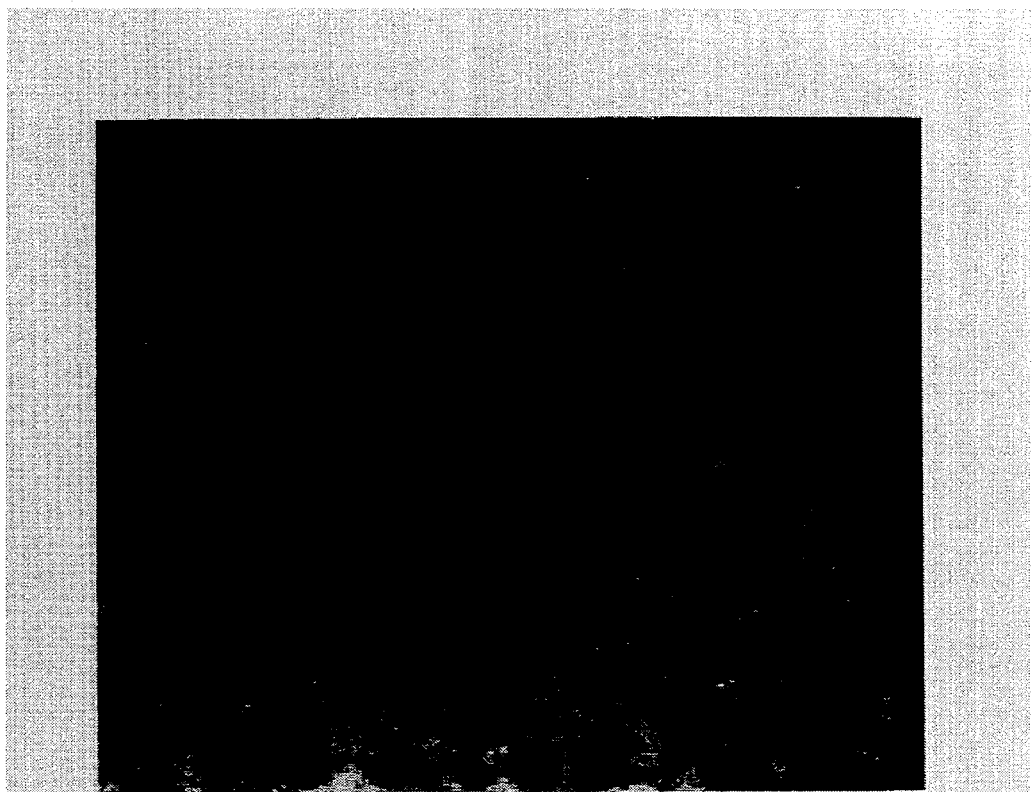
FIGS. 5, 6 and 7 are photomicrographs of cross sections of the ceramic composite materials of, respectively, Examples 1, 2 and 3.

In the practice of the present invention, the parent metal is provided as part of an assembly of a parent metal precursor and a configured fugitive metal. The fugitive metal is shaped or patterned to provide the configuration which is to be substantially inversely replicated as one or more channels within the ceramic body, preferably a ceramic composite body. By following the practices of the present invention, complex shapes such as a network of passageways can be inversely replicated within the ceramic body during formation or growth of the ceramic material. The term "inversely replicated" is used to signify that the channels in the ceramic body attained by the practices of the present invention are defined by interior surfaces of the ceramic body which are substantially congruent to the shape of the configured fugitive metal used in the process. The configured fugitive metal may be suitably shaped by any appropriate methods or means, for example, suitable metal wires may be formed into a network of wires defining the desired shape, size and location of a network of passageways. Alternatively, a piece of metal such as a bar, foil, rod or plate may be suitably machined or drawn to a desired configuration, or the configured fugitive metal may be cast, molded, extruded or otherwise shaped to provide it with a geometry congruent to that desired for the channels to be formed in the ceramic body. Typically, the respective length dimensions of elements of the configured fugitive metal exceed their respective cross-sectional thicknesses. Thus, it is possible to produce ceramic bodies with extremely narrow or fine openings such as by using wire as the configured fugitive metal. The configured fugitive metal may comprise one or more pieces of metal suitably shaped by one or more methods or means so that when emplaced within a bed of filler, or otherwise positioned adjacent to the parent metal precursor, the growing polycrystalline material provided by oxidation of the parent metal engulfs the configured fugitive metal and, if present, infiltrates the filler, or at least a part thereof.

Materials and reaction conditions are selected so that the polycrystalline material does not grow into and occupy the space occupied by the configured fugitive metal, but engulfs the configured fugitive metal which is then dispersed into the surrounding polycrystalline material. Whether the fugitive metal dissolves in, alloys with, diffuses into, or otherwise reacts with the polycrystalline material or constituents thereof, the result is that the configured fugitive metal ultimately migrates out of the space or volume initially occupied by it and into the body of polycrystalline material engulfing it. This leaves a shaped channel which substantially inversely replicates the geometry of the configured fugitive metal. The present invention thus provides the great advantage of enabling the geometry of the channels to be formed in the ceramic to be established by shaping or working the configured fugitive metal, instead of by drilling or otherwise machining the ceramic body.

The parent metal precursor can be in any suitable or convenient shape, such as ingots, plates, bars or the like, to provide a source of parent metal. With respect to forming the desired channels, it is not necessary to provide the parent metal in any particular shape or configuration so long as sufficient parent metal is positioned relative to the configured fugitive metal to engulf the latter, or a desired portion thereof, within the growing body of polycrystalline material obtained by oxidation of the parent metal. The parent metal may be selected from aluminum, zirconium, titanium, tin and silicon.

The filler optionally utilized in the practice of the invention may be one or more of a wide variety of materials suitable for the purpose. For example, the filler may comprise particulate material such as fine grains of a refractory metal oxide such as alumina, or it may be in the form of fibers or whiskers, or in the form of a fiber wool-like material, e.g., ceramic fibers. The filler may comprise a combination of two or more such geometric configurations, e.g., a combination of small particulate grains and fibers. It is necessary only that the physical configuration of the filler be such as to permit the configured fugitive metal to be placed on or within a bed or mass of the filler and that the filler be one which, under the oxidation reaction conditions of the invention as described below, is permeable to passage therethrough of the oxidant when such passage is necessary to contact the oxidant with the parent metal, and to the growth therethrough of the oxidation reaction product. The filler must be permeable to the oxidant when a vapor-phase oxidant is used, in order to enable the latter to contact and oxidize the molten parent metal within the mass of filler.

In practicing the process of this invention, an assembly of the configured fugitive metal and the parent metal precursor is prepared by positioning the configured fugitive metal and the parent metal adjacent to each other. These components may be supported as necessary by any suitable means, such as by supporting the configured fugitive metal on or partially or entirely within a bed of filler. The bed of filler may also contact or partially or entirely enclose the body of parent metal. The filler is optional and the configured fugitive metal and the parent metal may be positioned adjacent each other without the use of filler. In either case, the assembly is heated to a temperature lying in a range extending from above the melting point of the parent metal to below the melting point of the oxidation reaction product. This heating results in formation of a body or pool of molten parent metal which is exposed to an oxidizing environment at a temperature within the aforesaid range of temperatures. The molten parent metal reacts with the oxidant to form the polycrystalline material comprised of the oxidation reaction product, thereby commencing the embedment of the configured fugitive metal within the growing polycrystalline material. At least a portion of the oxidation reaction product is maintained in contact with and between the molten parent metal and the oxidant, such that upon continued exposure to the oxidant the molten parent metal is progressively drawn into and through the oxidation reaction product into contact with oxidant so as to cause continued growth of the polycrystalline material at the interface between previously formed oxidation reaction product and the oxidant. As the oxidation reaction product continues to grow, it infiltrates the filler, when filler is present, and engulfs the configured fugitive metal. The process is continued until the growing polycrystalline material has engulfed the configured fugitive metal or a selected portion thereof which is then dispersed into the polycrystalline material.

The polycrystalline material of the ceramic body produced in accordance with the present invention, in addition to optionally including a filler embedded therein, may include one or more metallic constituents, such as non-oxidized constituents of the parent metal, or may include voids, or both, depending on the conditions under which the oxidation reaction is carried out. The polycrystalline material also contains, at least in the vicinity or zone of the space originally occupied by the configured fugitive metal, the dispersed constituents of the fugitive metal. Typically, in these polycrystalline materials the oxidation reaction product comprises interconnected crystallites, preferably in three dimensions. The metal constituents or inclusions, or the voids, may also be at least partially interconnected.

The fugitive metal may comprise one whose melting point is about the same as or below the growth temperature although, in such cases, the fidelity of replication of the fugitive metals may suffer because of deformation, due to premature melting or softening of the configured fugitive metal under the oxidation reaction conditions. However, the adverse effects on faithful inverse replication of the configured fugitive metal of such premature melting or softening may be avoided or ameliorated where the metal pattern is supported by a bed, or by coating the configured fugitive metal with a refractory coating. For example, the configured fugitive metal may have a coating of fine particles of a self-bonding or sinterable material adhered thereto so that, upon reaching an elevated temperature, the coating bonds or sinters to form a hard shell encasing the configured fugitive metal. The coating or shell should not be impermeable to prevent dispersion of the fugitive metal into the oxidation reaction product. The coating may be one which reacts or becomes dispersed in, or indistinguishable from, the polycrystalline material.

Any problem of premature softening or melting of the configured fugitive metal with consequent loss of fidelity upon inverse replication of the configured fugitive metal is reduced by using as the fugitive metal a metal or alloy whose melting point is above the temperature at which the oxidation reaction may be efficiently carried out. When an aluminum parent metal is used, suitable fugitive metals which have a melting point above that at which the oxidation reaction product forms, may include, for example, iron-chromium-aluminum alloys of the type sold under the trademarks FECRALLOY, KANTHAL, and CABOT 214, which are, respectively, trademarks of the United Kingdom Atomic Energy Authority, Kanthal Corporation, and Cabot Company.

In some cases, it may be desirable to provide a lining for the channel walls in order to modify or improve the properties of the walls. This lining may be attained by coating the configured fugitive metal with a suitable material which then becomes engulfed by and integral with the ceramic body in the zone adjacent the formed channels. Alternatively, a coating may be selected which reacts with the molten parent metal to form a compound, such as an oxide, which then serves as a lining for the channels. Under the oxidation reaction conditions, the fugitive metal bearing the coating will disperse into the polycrystalline material and, in the zone adjacent the channels, a lining is developed from the coating material. The coating material is selected to provide a lining with desired properties, such as corrosion resistance. For example, the configured fugitive metal may be coated with non-reactive particles such as silicon carbide, alumina, or the like. The growing polycrystalline material infiltrates the particles and engulfs the fugitive metal, and thus forms for the channel a lining which comprises a matrix of polycrystalline material embedding the particles. Alternatively, the configured fugitive metal may be coated with a reactive compound such as an oxide which is reducible by the parent metal. The coating may be applied by forming the oxide particles into a paste with a suitable binder, such as an organic adhesive, and one or more coatings may be applied to the configured fugitive metal to provide a desired thickness. For example, in forming an alpha-alumina polycrystalline material obtained by oxidation of an aluminum parent metal in air, an oxide, such as chromium oxide, which is reducible by the molten aluminum parent metal, is applied as a coating to a fugitive metal such as Kanthal alloy (an iron-chromium-aluminum alloy). The chromium oxide is apparently reduced to metallic chromium, which is dispersed into the ceramic body, probably by reaction with one or more metals of the aluminum parent metal. The oxidation concomitant to the reduction of chromium oxide forms alumina with the result that the channel walls in the ceramic body are lined essentially by alumina. Such a technique can also be utilized in conjunction with one or more inert particulates as discussed above by, for example, admixing chromium oxide and alumina particles, and applying a coating of that admixture to the fugitive metal. It is thus seen that the coating applied to the configured fugitive metal can be utilized to not only provide a lining for the channel walls but to introduce one or more components which, as such or as constituents of a reaction product, are dispersed in the ceramic body and not limited to zones lining the channel walls.

Referring now to the drawings, FIG. 1 shows a refractory vessel 2, such as an alumina vessel, containing a bed of filler 4 within which is embedded a configured fugitive metal 6. Below the plane X—X is a support bed 8 of a particulate inert material which is non-wettable by the parent metal and not permeable to the growth of reaction product therethrough under the process conditions. For example, in the case of aluminum parent metal at moderate reaction temperatures, support bed 8 may comprise particles of EL ALUNDUM manufactured by Norton Company. Embedded within the bed of filler 4 and supported upon support bed 8 is a body of parent metal 10. Parent metal 10 may be of any suitable shape and, as shown in the illustrated embodiment of FIGS. 1, 2 and 3, it is of generally rectangular, flat configuration, having a top surface 11, an opposite, bottom surface 13 and unnumbered side surfaces.

Configured fugitive metal 6 comprises, in the illustrated embodiment, an assemblage of fugitive metal wires of circular cross section. Referring to FIGS. 1, 2 and 3, wire 12 has a washer 15 mounted adjacent its free end, and wire 12 is of a larger diameter than wire 14 which in turn is of a larger diameter than any one of wires 16a, 16b, 16c, 16d and 16e, which are each of the same diameter. As shown in FIG. 3, wire 14 is positioned substantially parallel to the facing top surface 11 of parent metal 10, as is each of wires 16a–16e, although only wire 16a is visible in FIG. 3. Wire 12 is not parallel to top surface 11 but is positioned to slant upwardly relative thereto as sensed in the direction from the free end of wire 12 towards the point at which it contacts wire 14. One end of each of wires 16a–16e contact wire 14. The individual wires may be joined to each other by a suitable adhesive, by a mechanical joint or by any suitable metal joining technique such as soldering, brazing or welding. Alternatively, configured fugitive metal 6 or segments thereof may be cast or otherwise provided as an integral unit. It will be appreciated that the configured fugitive metal 6 may be fabricated In any suitable desired shape. For example, one or more of the wires may be curved and the configured fugitive metal may include or comprise shaped pieces such as discs, cubes, cylinders of circular, oval or polygonal cross section, or shaped pieces such as screw-threaded, grooved or toothed members, etc. For example, a coil spring made of a suitable fugitive metal may be utilized to form a helical passageway within the ceramic body. Shaped pieces, and coiled, looped, straight or curved wires may be combined as desired to provide one or more channels of desired configuration.

The assembly of FIG. 1 is heated to a temperature within a range high enough to melt the parent metal 10 (and oxidize it), but not to melt the fugitive metal of configured fugitive metal 6 or the oxidation reaction product to be formed from the parent metal. A vapor-phase oxidant permeates the bed of filler 4 and contacts the molten parent metal within the stated temperature range to oxidize the molten parent metal and grow the oxidation reaction product therefrom. For example, when the parent metal is an aluminum parent metal, the oxidation reaction temperature may be from about 800° C. to 1450° C., preferably from about 900° C. to 1350° C. and, with air or other oxygen-containing gas as the oxidant, the resulting oxidation reaction product is alpha-alumina. The molten parent metal is drawn through the formed oxidation reaction product to form a ceramic body which grows to the extent indicated by dash-line 5 in FIG. 1. As the action continues, configured fugitive metal 6 is engulfed by the polycrystalline material. The reaction is continued until the growing polycrystalline material infiltrates at least a part of the surrounding bed of filler 4 and all or nearly all of configured fugitive metal 6. It may be convenient to have the distal portions of wires 12 and 16a–16e, inclusively, extend beyond the extent of growth of the ceramic body obtained by oxidation of the parent metal, in order to render the location of the wires visible in the ceramic body. The fugitive metal is dispersed within the polycrystalline material which engulfs it, thus migrating from and leaving as a void or channel the space formerly occupied by configured fugitive metal 6. Without wishing to be bound by any theory or speculation, it appears that the configured fugitive metal 6 survives long enough under the oxidation reaction conditions that the growing polycrystalline material is constrained to grow around it so that, upon eventual dispersal of the fugitive metal, there remains within the ceramic body, channels which substantially inversely replicate the shape of the configured fugitive metal 6 or, more precisely, which inversely replicate the former shape of the now-dispersed configured fugitive metal 6. The dimensions of each element or portion of configured fugitive metal 6 are at least approximately congruent to the dimensions of the channels formed within the ceramic body.

Upon completion of the reaction, which desirably is upon substantially complete oxidation of the parent metal body in order to avoid obstructing the formed channel(s) with parent metal, and engulfment of the configured fugitive metal 6 (and some of filler 4) by the polycrystalline material, the assembly is allowed to cool and the resultant ceramic composite body, whose dimensions are indicated by dashline 5 in FIG. 1, is separated from excess filler, if any, left within vessel 2. Such excess filler or part thereof may form a coherent body because the filler or a portion thereof may be self-bonding at the reaction temperature. However, even if partially sintered, the excess filler may be readily removed from the ceramic composite body by sand blasting, grinding, or the like. An economical technique is to employ sand blasting utilizing as a grit particles of a material which is suitable as the filler or as a component of the filler so that the removed filler and grit may be reused as filler in a subsequent operation. In any case, the ceramic composite body, having the one or more channels formed therein, is machined or ground or otherwise formed to have a desired outer shape. For example, as illustrated in FIG. 4, the ceramic composite body 18 has been machined into the shape of a flat, rectangular block which has a top surface 20, a front face 22 and a rear face 24. Formed within ceramic composite body 18 are channels comprised of interconnected circular passageways 12' having recess 15' connected to a manifold passageway 14' which in turn is connected to each of a series of discharge passageways 16a', 16b', 16c', 16d' and 16e'. One end of the discharge passageways open into front face 22 and one end of passageway 12' opens into rear face 24 of ceramic body 18. It will be appreciated that the shape of the various passageways inversely replicate the shape of the configured fugitive metal 6. The passageways are numbered identically to the individual wire whose shape they inversely replicate, except for the addition of a prime indicator. Ceramic body 18 thus comprises an article which is well adapted to serve as a nozzle or distributor for a fluid introduced through passageway 12' and dispersed through passageways 16a'–16e'. The passageways are precisely positioned and dimensioned without need to drill through the ceramic body 18. Instead of growing the ceramic body to a rough shape and then machining it to a finished outer configuration, the ceramic body can be grown to a desired size and shape by suitable techniques, such as using a shaped preform filler as described in detail in the above-identified Commonly Owned patent application Ser. No. 861,025. Such techniques avoid the necessity of extensive grinding or machining of the ceramic body.

Where desired, the ceramic body may be grown to completely engulf the fugitive metal pattern, and therefore no formed channel will be open to an exterior surface. The ceramic product can be opened, i.e., it can be cut, ground, fractured, machined, etc., so as to connect or expose at least one of the channels to the surface.

A self-supporting ceramic composite body fabricated in accordance with the present invention is suitable for use as a fluid discharge nozzle, spinneret, metering jet, or similar article for regulating or facilitating the flow or passage of a fluid such as a liquid, gas, molten metal, polymer, resin or the like. As used herein and in the claims, "fluid discharge nozzle" is used broadly to mean any type of nozzle such as liquid spray or discharge nozzles, extrusion nozzles, nozzles such as those used in melt-blowing or spun-bonding of synthetic fibers or filaments, etc., and "spinneret" means a specialized nozzle usually used in melt-spinning of glass fibers or synthetic organic polymeric fibers. The fugitive metal is shaped and positioned in the filler according to the configuration and dimensions desired for the channel or channels which will comprise the fluid flow path. The channel(s) formed in the ceramic body are configured to have an inlet and an outlet by configuring the fugitive metal such that the formed channel(s) will be accessible from one or more surfaces of the ceramic composite body, or by post-process opening of the composite body having the desired channel(s) formed therein, in order to access one or more of the channels. By "opening" of the ceramic composite body is meant any machining, cutting, grinding, drilling, fracturing, or the like, of the ceramic body to provide access to one or more channels. The present invention enables the fabrication of ceramic composite articles having an intricate fluid path. For example, an article can be fabricated in accordance herewith which combines a number of inlet channels into fewer or a single outlet channel, or conversely which divides the inlet flow from a single inlet channel into a number of outlet channels as in, for example, a fuel injector nozzle for an internal combustion engine, or a spinneret suitable for extruding polymeric fibers. Likewise, by specifically configuring the dimensions of the fugitive metal, an intricate flow path between the inlet and outlet channels can be established, which provides, for example, a mixing chamber for blending of separate fluids supplied to the channel by a multitude of inlet channels.

Although specific embodiments of the invention have been described in detail with specific reference to aluminum as the parent metal, other suitable parent metals which meet the criteria of the present invention include, but are not limited to, silicon, titanium, tin, zirconium and hafnium. For example, specific embodiments of the invention include, when aluminum is the parent metal, alpha-alumina or aluminum nitride as the oxidation reaction product; titanium as the parent metal and titanium nitride as the oxidation reaction product; silicon as the parent metal and silicon carbide as the oxidation reaction product.

A solid, liquid, or vapor-phase oxidant, or a combination of such oxidants, may be employed. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as sources of carbon), and mixtures such as air, $H_2/H_2O$ and $CO/CO_2$, the latter two (i.e., $H_2/H_2O$ and $CO/CO_2$) being useful in reducing the oxygen activity of the environment. Accordingly, the ceramic structure of the invention may comprise an oxidation reaction product comprising one or more of oxides, nitrides, carbides, borides and oxynitrides, among others. More specifically, the oxidation reaction product may be one or more of aluminum oxide, aluminum nitride, silicon carbide, silicon boride, aluminum boride, titanium nitride, zirconium nitride, titanium boride, zirconium boride, zirconium carbide, silicon nitride, molybdenum silicide, titanium carbide, hafnium carbide, hafnium boride and tin oxide.

Although specific embodiments of the invention are described with reference to use of vapor-phase oxidants, any suitable oxidants may be employed. If a gas or vapor oxidant, i.e., a vapor-phase oxidant, is used to make a ceramic body which embeds a filler, the filler used is one which is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere, preferably at atmospheric pressure. For example, oxygen or gas mixtures containing oxygen (including air) are preferred vapor-phase oxidants, as in the case where aluminum is the parent metal and aluminum oxide is the desired reaction product, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant is forming gas, which typically contains 96 volume percent nitrogen and 4 volume percent hydrogen.

When a solid oxidant is employed, it is usually dispersed through the entire bed of filler or through a portion of the bed adjacent the parent metal, in the form of particulates admixed with the filler, or perhaps as a coating on the filler particles. Any suitable solid oxidant may be employed, including elements, such as boron or carbon, or reducible compounds, such as silicon dioxide or certain borides of lower thermodynamic stability than the boride reaction product of the parent metal. For example, when silica is used as a solid oxidant for an aluminum parent metal the resulting oxidation reaction product is alumina.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided or moderated by mixing into the composition relatively inert fillers which exhibit low reactivity. An example of such a suitable inert filler is one which is identical to the intended oxidation reaction product.

If a liquid oxidant is employed, the entire bed of filler or a portion thereof adjacent the molten metal is impregnated with the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler as by immersion and is melted or decomposed at the oxidation reaction conditions to provide a suitable oxidant moiety. Examples of liquid oxidants as herein defined include low melting glasses.

The filler, when utilized, may comprise either a single material or mixtures of two or more materials, and further will not become dispersed into the polycrystalline material. One suitable class of filler includes those chemical species which, under the temperature and oxidizing conditions of the process, are not volatile, are thermodynamically stable and do not react with or dissolve excessively in the molten parent metal. Numerous materials are known to those skilled in the art as meeting such criteria: for example, in the case where aluminum parent metal and air or oxygen as the oxidant is employed, such materials include the single metal oxides of: aluminum, $Al_2O_3$; calcium, $CaO$; cerium, $CeO_2$; hafnium, $HfO_2$; lanthanum, $La_2O_3$; lithium, $Li_2O$; magnesium, $MgO$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgO.Al_2O_3$, are contained in this class of stable refractory compounds.

A second class of suitable filler or filler components are those which are not intrinsically stable in the oxidizing and high temperature environment of the preferred embodiment, but which, due to relatively slow kinetics of the degradation reactions, can be incorporated as a filler phase within the growing ceramic body. An example is silicon carbide. This material would oxidize completely under the conditions necessary to oxidize aluminum with oxygen or air in accordance with the invention were it not for a protective layer of silicon oxide forming and covering the silicon carbide particles to limit further oxidation of the silicon carbide. The protective silicon oxide layer also enables silicon carbide particles to sinter or bond to themselves and to other components of the filler.

A third class of suitable filler materials are those, such as carbon fibers, which are not, on thermodynamic or on kinetic grounds, expected to survive the oxidizing environment necessary for practice of the invention or the exposure to molten metal involved with the preferred embodiment, but which can be made compatible with the process of the present invention if 1) the environment is made less active, for example, through the use of $H_2/H_2O$ or $CO/CO_2$ as the oxidizing gases, or 2) through the application of a coating thereto, such as aluminum oxide, which makes the filler kinetically nonreactive in the oxidizing environment, or when in contact with the molten metal.

As explained in the Commonly Owned Patent and Patent Applications, dopant materials used in conjunction with the parent metal can, in certain cases, favorably influence the oxidation reaction process, particularly in systems employing aluminum as the parent metal. The function or functions of a dopant material can depend upon a number of factors other than the dopant material itself. Such factors include, for example, the particular combination of dopants when two or more dopants are used, the use of an externally applied dopant in combination with a dopant alloyed with the parent metal, the concentration of the dopant, the oxidizing environment, and the process conditions.

The dopant or dopants used in conjunction with the parent metal (1) may be provided as alloying constituents of the parent metal, (2) may be applied to at least a portion of the surface of the parent metal, or (3) may be applied to or incorporated into part or all of the filler material or preform, or any combination of two or more techniques (1), (2) and (3) may be employed. For example, an alloyed dopant may be used solely or in combination with a second, externally applied dopant. In the case of technique (3), where additional dopant or dopants are applied to the filler material, the application may be accomplished in any suitable manner as explained in the Commonly Owned patent applications.

Dopants useful for an aluminum parent metal, particularly with air as the oxidant, include magnesium, zinc and silicon either alone or in combination with each other or in combination with other dopants, as described below. These metals, or a suitable source of the metals may be alloyed into the aluminum-based parent metal at concentrations for each of between about 0.1–10 percent by weight based on the total weight of the resulting doped metal. These dopant materials or a suitable source thereof, e.g., $MgO$, $ZnO$, or $SiO_2$, may be used externally to the parent metal. Thus an alumina ceramic structure is achieveable for an aluminum-silicon alloy as the parent metal using air as the oxidant by using $MgO$ as a surface dopant in an amount greater than about 0.0008 gram per gram of parent metal to be oxidized and greater than about 0.003 gram per square centimeter of parent metal surface upon which the $MgO$ is applied.

Additional examples of dopant materials effective with aluminum parent metals oxidized with air include sodium, germanium, tin, lead, lithium, calcium, boron, phosphorus and yttrium which may be used individually or in combination with one or more dopants depending on the oxidant and process conditions. Rare earth elements such as cerium, lanthanum, praseodymium, neodymium and samarium are also useful dopants, and herein again especially when used in combination with other dopants. All of the dopant materials, as explained in the Commonly Owned patent applications, are effective in promoting polycrystalline oxidation reaction product growth for the aluminum-based parent metal systems.

The ceramic composite structure obtained by the practice of the present invention will usually be a dense, coherent mass wherein between about 5% and about 98% by volume of the total volume of the composite structure excluding the channels is comprised of one or more of the filler components embedded within a polycrystalline matrix material. The polycrystalline matrix material is usually comprised of, when the parent metal is aluminum, about 60% to about 98% by weight (of the weight of polycrystalline material) of interconnected alpha-aluminum oxide and about 1% to 40% by weight (same basis) of non-oxidized constituents of the parent metal and fugitive metal.

The following Examples exemplify the practice of certain aspects of the invention.

EXAMPLE 1

A ceramic composite body was fabricated in accordance with the present invention such as to have a helical channel incorporated within its structure. The fugitive metal employed was a commercially available metal wire (KANTHAL A, from the Kanthal Corporation, having an alloy composition by weight of 5% Al, 22% Cr, 0-5% Co, balance Fe, a melting point of approximately 1510° C. and measuring 0.032 inch in diameter). A strand of the above-described wire was wound into a coil, approximately 1 inch long and ⅞ inch in diameter. The coil was heated in an atmosphere of oxygen at 1200° C. for 36 hours to develop an oxide coating over its surface. The coiled strand was removed and placed around a cylindrical ingot of an aluminum alloy 380.1 (from Belmont Metals, having a nominal specification by weight of 8-8.5% Si, 2-3% Zn, and 0.1% Mg as active dopants, and 3.5% Cu as well as Fe, Mr, and Ni, with the balance Al, but we find the Mg content to be sometimes higher as in the range of 0.17-0.18%). The ingot measured 1 inch long and ⅞ inch in diameter, such that the turns of the coil began at one end of the ingot and ended at the other end of the ingot. The coil-wrapped ingot was placed into a bed of alumina filler material (38 ALUNDUM, from Norton, Co., 90 mesh size), which was contained in a refractory vessel, such that one circular face of the ingot protruded slightly above the level of the filler bed. A layer of alumina particles (EL ALUNDUM, from Norton, 90 mesh size) which were substantially refractory at the process temperature with respect to embedment by the alumina oxidation reaction product, was placed over the filler bed so as to cover the exposed ingot surface. This setup was placed into a furnace and heated up over 5 hours to 1050° C. The furnace temperature was held at 1050° C. in air for 48 hours, and cooled back down over another 5 hour period. The setup was removed from the furnace and the ceramic composite body, comprising the aluminum oxidation reaction product embedding constituents of the alumina filler bed, was recovered. The excess unembedded filler material was removed from the surface of the composite, and the ceramic composite body was cross-sectioned to reveal the developed helical channel having the geometry of the fugitive metal coil. FIG. 5 is a photomicrograph of the cross-sectioned ceramic composite taken at 100X magnification. As shown in the FIGURE, the fugitive metal was dispersed from its original position, thereby forming the channel. The diameter of the resulting channel was measured at 0.035 inch. The slight difference measured in the diameter of the fugitive metal wire and the diameter of the channel formed is attributed to the difference between the thermal expansion of the metal wire which occurs on heating and the thermal contraction of the composite body which occurs on cooling.

EXAMPLE 2

Figure 6:
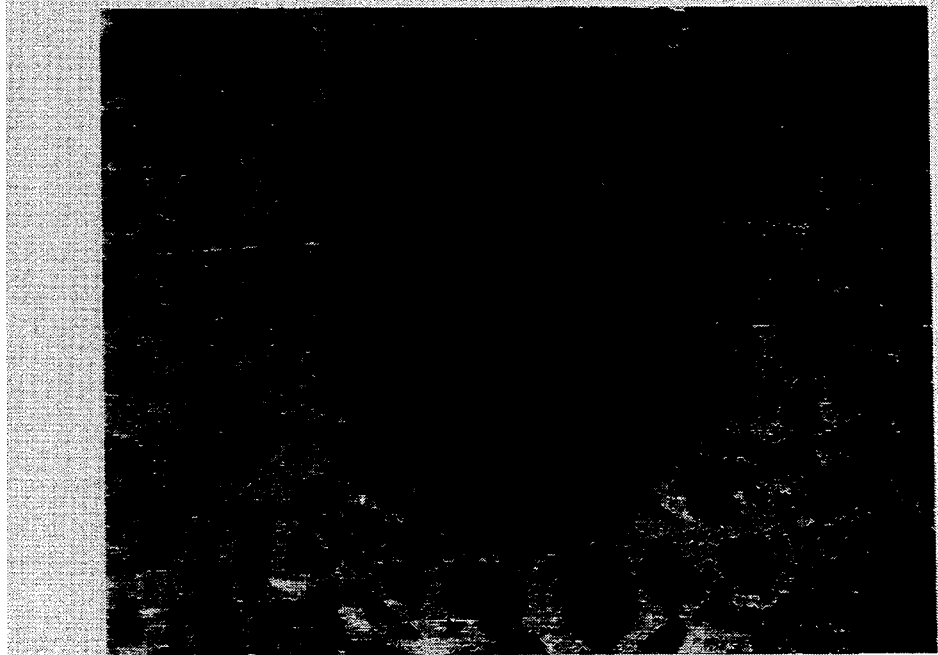

A ceramic composite body was fabricated in accordance with the present invention such as to have four substantially parallel channels incorporated within its structure. The fugitive metal employed comprised four strands of nickel wire (99.9975% pure having a melting point of 1453° C.) measuring approximately 4 inches long and 1 mm in diameter. A bar of the same aluminum alloy 380.1 employed in Example 1, and measuring 4½ inches long by 2 inches wide by ½ inch thick was placed into a bed of the same refractory alumina particles (EL ALUNDUM, from Norton, 90 mesh), employed in Example 1, such that one 4½ by 2 inch face was exposed to the atmosphere and substantially flush with the refractory bed. A layer, approximately ¼ inch deep, of alumina filler material (38 ALUNDUM, from Norton, 90 mesh) was placed on top of the exposed aluminum alloy surface. The four nickel metal wires were placed substantially parallel to one another on top of the layer of filler such that they were approximately parallel to, and equidistant from, the 4½ by 2 inch surface of the underlying aluminum alloy bar. The wires were then covered with a layer of the same alumina filler material (38 ALUNDUM). This setup was placed into a furnace, and heated up in air over 5 hours to 1080° C. The furnace temperature was held at 1080° C. for 48 hours, and cooled down over a 5 hour period. The setup was removed from the furnace, and the resulting ceramic composite body, comprising the alumina oxidation reaction product embedding constituents of the alumina filler material, was recovered. The recovered ceramic composite was cross-sectioned to illustrate the incorporated channels replacing the nickel metal wires. FIG. 6 is a photograph of the cross-sectioned composite body, illustrating one of the four parallel channels within its structure. The diameter of one channel was measured, and was 1.06 mm.

EXAMPLE 3

Figure 7:
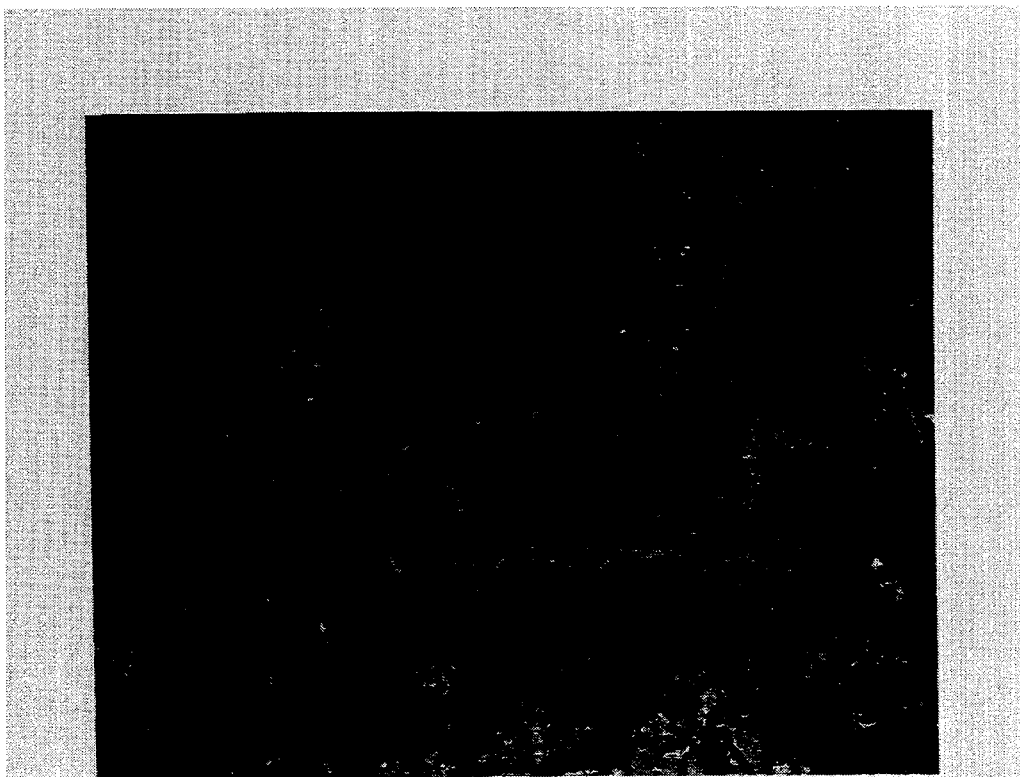

The setup and procedure described in Example 2 were duplicated except that the fugitive metal wires comprised the KANTHAL A material, employed in Example 1, coated over their surface by a layer of Cr₂O₃ (admixed with polyvinyl alcohol to serve as an application vehicle, and applied as a layer and then coated with an admixture of colloidal silica and alumina particles (38 ALUNDUM, from Norton Co., 500 grit). The setup was heated over the same cycle as described in Example 2, and the resulting composite was recovered. The recovered composite was cross-sectioned to reveal the formed channels. FIG. 7 is a photomicrograph at 50X magnification showing one of the channels formed by the substantial exhaustion of the fugitive metal from its original position. Further, the photograph shows the annular lining, which is essentially concentric with the channel, resulting from the coating. Upon analysis of the lining by scanning electron microscopy, the lining was substantially alumina. The diameter of the channel shown in FIG. 7 was measured to be 0.035 inch.

EXAMPLE 4

Figure 8:
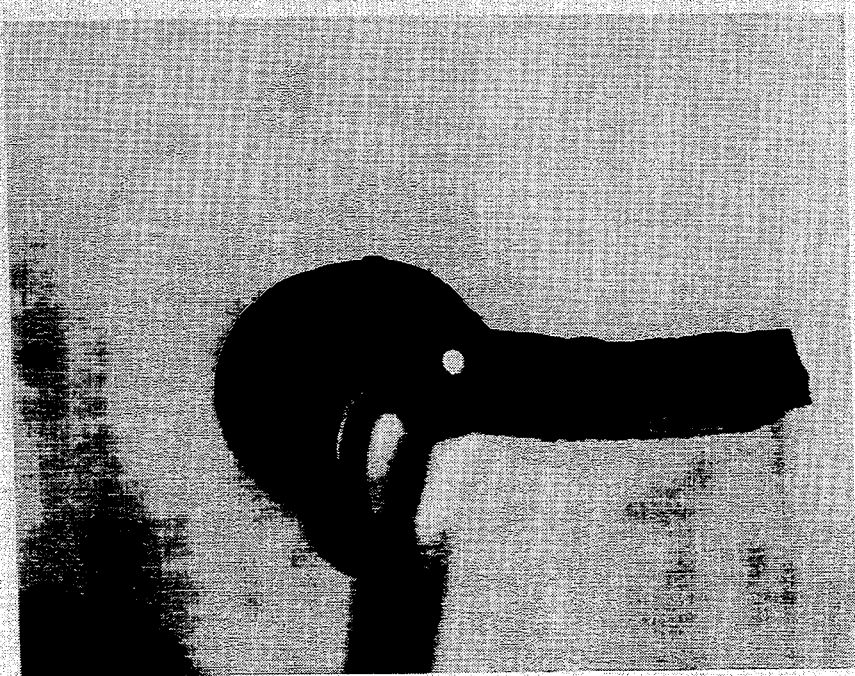
FIG. 8 is a photograph of a ceramic composite body having therein channels made by the method of the present invention, with one of the channels illuminated from behind to illustrate the continuity of the illuminated channel.

The setup in Example 2 was again duplicated except that the four wires of fugitive metal employed were comprised of a nickel-chromium-aluminum super alloy (Cabot 214, from Cabot Corporation, having an alloy composition by weight of 16% Cr, 4.5% Al, 2% Co, 2.5% Fe, 0.5% Mo, 0.5% W, 0.05% C, 0.02% Y, 0.01% B, and balance Ni and a melting point of approximately 1345° C.). The setup was placed into a furnace and heated up over 5 hours to 1050° C. The furnace temperature was held at 1050° C. for 72 hours, and then cooled down over 5 hours. The ceramic composite was removed, and cross-sectioned to illustrate the channels formed by the substantial exhaustion of the fugitive metal wires from their original position and dispersed within the composite structure. FIG. 8 is a photograph of the cross-sectioned ceramic composite with a light source positioned beneath one of the formed channels to illuminate it and thus to demonstrate the continuity of the illuminated channel.

Although only a few exemplary embodiments of the invention have been described in detail above those skilled in the art will readily appreciate that the present invention embraces many combinations and variations other than those exemplified.

What is claimed is:

1. An article for regulating and facilitating the passage of a fluid therethrough, said article comprising:
   (a) a first ceramic matrix incorporating at least one first filler material, said first ceramic matrix embedding said first filler material and said first ceramic matrix consisting essentially of about 60–99 percent by weight of a first polycrystalline oxidation reaction product consisting of aluminum essentially of a material selected from the group consisting oxide, aluminum nitride, silicon nitride, silicon carbide, silicon boride, silicon oxide, aluminum boride, titanium nitride, zirconium nitride, titanium boride, zirconium boride, tin oxide and aluminum oxynitride, and the remainder of said first ceramic matrix consisting essentially of at least one first metallic constituent and voids; and
   (b) at least one channel wherein at least a portion of at least one wall of said at least one channel comprises a lining, said lining comprising a second ceramic matrix, said second ceramic matrix consisting essentially of about 60–99% by weight of a second polycrystalline oxidation reaction product consisting essentially of a material selected from the group consisting of aluminum oxide, aluminum nitride, silicon carbide, silicon boride, aluminum boride, aluminum carbide, titanium nitride, zirconium nitride, titanium boride, zirconium boride, tin oxide and aluminum oxynitride, and the remainder of said second ceramic matrix consisting essentially of at least one second metallic constituent and voids.

2. An article for regulating and facilitating the passage of a fluid therethrough, said article comprising:
   (a) a first ceramic matrix consisting essentially of about 60–99% by weight of a first polycrystalline oxidation reaction product consisting essentially of a material selected from the group consisting of aluminum oxide, aluminum nitride, silicon nitride, silicon carbide, silicon boride, silicon oxide, aluminum boride, titanium nitride, zirconium nitride, titanium boride, zirconium boride, tin oxide and aluminum oxynitride, and the remainder of said first ceramic matrix consisting essentially of at least one first metallic constituent and voids; and
   (b) at least one channel wherein at least a portion of at least one wall of said at least one channel comprises a lining, said lining comprising a second ceramic matrix, said second ceramic matrix consisting essentially of about 60–99% by weight of a second polycrystalline oxidation reaction product consisting essentially of a material selected from the group consisting of aluminum oxide, aluminum nitride, silicon nitride, silicon carbide, silicon boride, silicon oxide, aluminum boride, aluminum carbide, titanium nitride, zirconium nitride, titanium boride, zirconium boride, tin oxide and aluminum oxynitride, and the remainder of said second ceramic matrix consisting essentially of at least one second metallic constituent and voids.

3. An article for regulating and facilitating the passage of a fluid therethrough, said article comprising:
   (a) a first ceramic matrix incorporating at least one first filler material, said first ceramic matrix embedding said first filler material and said first ceramic matrix consisting essentially of about 60–99 percent by weight of a first polycrystalline oxidation reaction product consisting essentially of a material selected from the group consisting of aluminum oxide, aluminum nitride, silicon nitride, silicon carbide, silicon boride, silicon oxide, aluminum boride, titanium nitride, zirconium nitride, titanium boride, zirconium boride, tin oxide and aluminum oxynitride, and the remainder of said first ceramic matrix consisting essentially of at least one first metallic constituent and voids;
   (b) at least one channel wherein at least a portion of at least one wall of said at least one channel comprises a lining comprising at least one material selected from the group consisting of aluminum oxide, aluminum nitride and silicon carbide.

4. The article of claim 1, wherein said at least one channel has at least one cross-sectional geometry selected from the group consisting of cylindrical, cubed, oval and polygonal.

5. The article of claim 2, wherein said at least one channel has at least one cross-sectional geometry selected from the group consisting of cylindrical, cubed, oval and polygonal.

6. The article of claim 3, wherein said at least one channel has at least one cross-sectional geometry selected from the group consisting of cylindrical, cubed, oval and polygonal.

7. The article of claim 4, wherein at least one channel further comprises at least one surface geometry selected from the group consisting of screw-threaded, grooved, toothed and helical.

8. The article of claim 5, wherein at least one channel further comprises at least one surface geometry selected from the group consisting of screw-threaded, grooved, toothed and helical.

9. The article of claim 6, wherein at least one channel further comprises at least one surface geometry selected from the group consisting of screw-threaded, grooved, toothed and helical.

10. The article of claim 1, wherein said at least one channel has at least one longitudinal geometry selected from the group consisting of curved, straight, coiled and looped.

11. The article of claim 2, wherein said at least one channel has at least one longitudinal geometry selected from the group consisting of curved, straight, coiled and looped.

12. The article of claim 3, wherein said at least one channel has at least one longitudinal geometry selected from the group consisting of curved, straight, coiled and looped.

13. The article of claim 1, wherein said article comprises at least one article selected from the group consisting of a nozzle and a distributor.

14. The article of claim 2, wherein said article comprises at least one article selected from the group consisting of a nozzle and a distributor.

15. The article of claim 3, wherein said article comprises at least one article selected from the group consisting of a nozzle and a distributor.

16. The article of claim 13, wherein said article comprises a nozzle comprising at least one nozzle selected from the group consisting of a fluid discharge nozzle, a liquid spray nozzle, an extrusion nozzle, a melt-blowing nozzle, a spun-bonding nozzle and a spinneret.

17. The article of claim 14, wherein said article comprises a nozzle comprising at least one nozzle selected from the group consisting of a fluid discharge nozzle, a liquid spray nozzle, an extrusion nozzle, a melt-blowing nozzle, a spun-bonding nozzle and a spinneret.

18. The article of claim 15, wherein said article comprises a nozzle comprising at least one nozzle selected from the group consisting of a fluid discharge nozzle, a liquid spray nozzle, an extrusion nozzle, a melt-blowing nozzle, a spun-bonding nozzle and a spinneret.

19. The article of claim 13, wherein said nozzle comprises a fuel injector nozzle for an internal combustion engine.

20. The article of claim 14, wherein said nozzle comprises a fuel injector nozzle for an internal combustion engine.

21. The article of claim 15, wherein said nozzle comprises a fuel injector nozzle for an internal combustion engine.

22. The article of claim 1, wherein said article comprises a plurality of channels comprising at least two inlet channels and at least one outlet channel, and further comprising at least one mixing chamber for blending of separate fluids supplied to the at least one outlet channel by the at least two inlet channels.

* * * * *